April 9, 1929. J. L. LAWRENCE 1,708,796
APPARATUS FOR USE IN THE PRACTICE OF BALL GAMES
Filed Aug. 6, 1928
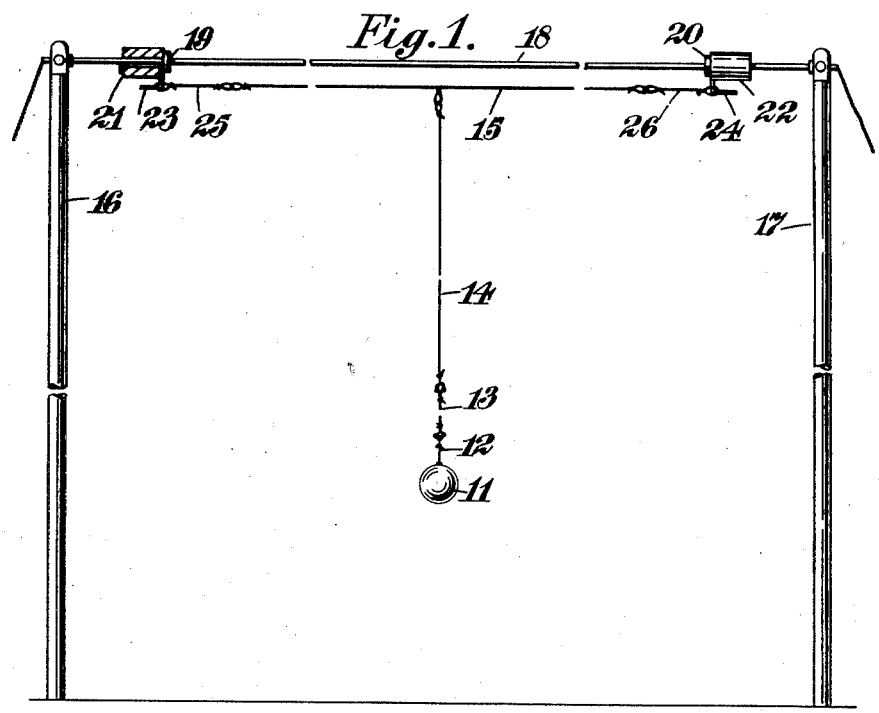
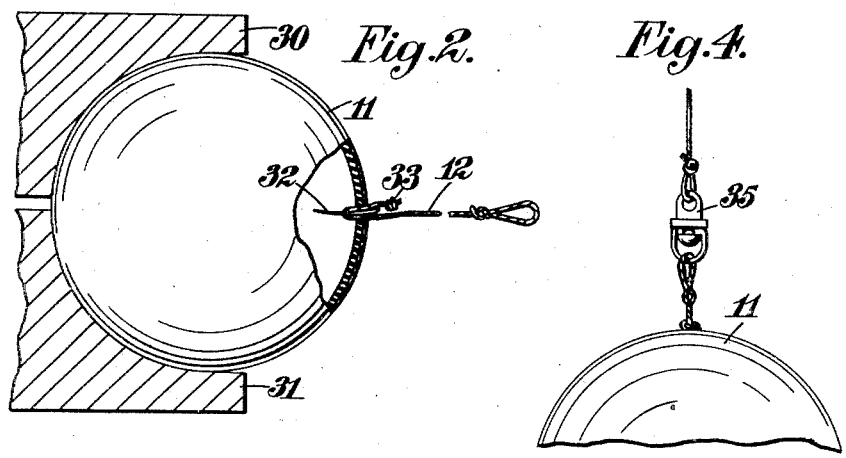
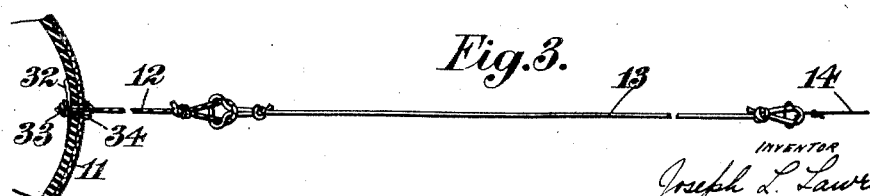
INVENTOR
Joseph L. Lawrence
By Watson, Coit, Morse & Grindle Patented Apr. 9, 1929.

1,708,796

UNITED STATES PATENT OFFICE.

JOSEPH L. LAWRENCE, OF LONDON, ENGLAND, ASSIGNOR TO STANLEY DELAPENA, OF CLEMENTS INN, ENGLAND.

APPARATUS FOR USE IN THE PRACTICE OF BALL GAMES.

Application filed August 6, 1928, Serial No. 297,777, and in Great Britain May 29, 1928.

This invention is for improvements in or relating to apparatus for use in the learning, practising and playing of tennis and like ball games in which a ball is repeatedly struck by a bat, club, racquet or the like.

The present invention comprises in apparatus for a ball game the combination of a hollow ball (for example a tennis ball) or a ball of the kind which is filled with sponge rubber, and an elastic suspension therefor comprising a line attached at one end to the ball by being entered through the wall of the ball and anchored therein by a stop on the line within the wall.

Preferably the ball contains self-sealing fluid the effect of which is to ensure that the ball remains inflated notwithstanding the insertion of the cord.

Preferably the stop on the line takes the form of a curved needle having an eye between its end through which the line is threaded. The curved needle may be pointed at one end or it may be blunt, but this form of stop, while very effective for retaining the line, offers no difficulty in insertion through a small hole in the wall of the ball. Indeed, it helps to thread the line through the wall.

In order to obtain a secure attachment, the line where it is attached to the ball preferably consists of a short length of inextensible material, for example, strong twine. This section should be as short as practicable, and as the line in the neighbourhood of the ball is liable to be damaged by impact with racquets and the like, the next section of the line is preferably made of braided india rubber. The braided india rubber being less elastic than unbraided rubber is not made too long, but is attached to a strand of unbraided rubber which constitutes the major portion of the line.

According to a further feature of the invention apparatus for ball games is provided comprising in combination a hollow ball, for example, a tennis ball, a section of braided india rubber secured thereto, a section of unbraided rubber secured to the end of the braided rubber remote from the ball and a transverse elastic line secured at its ends to supports and to which the end of the unbraided rubber is attached between the supports.

The accompanying drawing illustrates a construction in accordance with the invention by way of example.

In the drawing,

Figure 1 is a general elevation of the parts,

Figure 2 illustrates the method of attaching the ball to the line,

Figure 3 shows a section of line and ball, and

Figure 4 is a detail of a modification.

Referring to Figure 1, a tennis ball 11 secured to a short length of inextensible line 12 which is composed of strong twine. The line 12 is looped at its end and the loop is threaded on a corresponding loop of a second section 13, the method of looping and securing the sections together being shown in detail in Figure 3. This allows of ready detachment of any section in the event of breakage so that replacement is simplified. The section 13 is made of braided india rubber and is looped to another section 14 consisting of a thin strand of plain rubber elastic. The section 14 is again looped on to the centre of a transverse section 15 of plain unbraided rubber elastic and the transverse section 15 is held stretched transversely between lateral supporting posts 16, 17. The method of attachment of the section 15 is as follows:—

A cross-wire 18 extends between the posts 16, 17 and carries stops 19, 20 near its ends. Bobbins 21, 22 are threaded upon the wire outside the stops and carry hooks 23, 24. To the hooks are secured short lengths of elastic 25, 26 and the ends of these are looped on to the cross elastic 15.

It is found that breakages most frequently occur near the ends of the cross elastic 15 or on the sections 12 and 13 to which the ball is attached. The object, therefore, of making these sections as separate pieces looped to the rest of the elastic is to facilitate rapid renewal.

In attaching the ball 11 to the twine 12 it is important to be able to make an attachment which is secure and which does not interfere with the resiliency of the ball itself. To this end the ball 11 contains a self-sealing mixture such as is sometimes employed in connection with non-puncturable pneumatic tyres. The ball is held between jaws 30, 31 of a vice and a hole, as small as practicable, is punched by a hollow punch in the side of the ball. Owing to the self-sealing material contained within the ball, no appreciable leakage takes place when this is done. The twine 12 is threaded through a short curved needle 32 which has its eye in the centre, and the twine is knotted at 33 near its end. To insert the twine into the ball the knot 33 is first drawn away from the needle, as shown in Figure 2, and the needle is threaded endwise into the hole carrying a bight of twine with it. Afterwards, the knot is pushed in and on drawing up the cord, the needle is brought firmly back against the interior of the wall of the ball 11. A knot 34 is then made against the outside of the wall and the whole is thereby secured firmly in position.

In use the ball is struck with an implement, say a tennis racquet, and if the elasticity of the cord is rightly chosen, it can travel a considerable distance, say 20 feet, and will return in a line which is determined by its position at the end of its travel. The player strikes the ball on its return and it will generally be found that the ball takes a different direction and speed each time it is struck and thus provides admirable practice in judging line of flight and timing.

It is sometimes found that players desire to impart spin to the ball and while the construction described permits of a considerable amount of spin owing to twist of the elastic, it is possible, if desired, to employ a swivel eye 35, as shown in Figure 4, to permit spinning without twisting the elastic. The swivel eye should be mounted as near as possible to the ball so as to avoid being struck by the racquet.

I claim:

1. In apparatus of the class described, the combination with a ball of a support for said ball comprising elastic means supported at each end, and a second elastic means secured at one end to said first elastic means intermediate the ends thereof, and at its opposite end to said ball.

2. In apparatus of the class described, the combination with a ball, of a rigidly mounted substantially horizontally extending member, spaced members rotatably mounted on said first mentioned member and an elastic flexible connection between said spaced members and said ball.

3. In apparatus of the class described, the combination with a ball of a support for said ball comprising spaced members, elongated elastic means secured at each end to said spaced members, and a second elastic means secured at one end to said first elastic means intermediate the ends thereof, and at its opposite end to said ball, said second elastic means comprising a highly elastic section, and a section of less elasticity and capable of sustaining materially greater stress, the last mentioned section being disposed adjacent the ball.

4. In apparatus of the class described, the combination with a ball, of a rigidly mounted substantially horizontally extending member, spaced members rotatably mounted on said first mentioned member and a flexible connection between said spaced members and said ball, said flexible connection comprising elastic means secured to said spaced members and a second elastic means secured at one end to said first elastic means intermediate the ends thereof, and at its opposite end to said ball.

5. In apparatus of the class described, the combination with a ball, of a rigidly mounted substantially horizontally extending member, spaced members rotatably mounted on said first mentioned member and a flexible connection between said spaced members and said ball, said flexible connection comprising elastic means secured to said spaced members and a second elastic means secured at one end to said first elastic means intermediate the ends thereof, and at its opposite end to said ball, said second elastic means including a highly elastic section, and a section of less elasticity and capable of sustaining materially greater stress, the last mentioned section being disposed adjacent the ball.

6. In apparatus of the class described, the combination with a ball of a support for said ball comprising elongated elastic means supported at each end, and a second elastic means secured at one end to said first elastic means intermediate the ends thereof, and at its opposite end to said ball, the elasticity of both of said means being sufficiently high to permit the ball on propulsion thereof to deflect materially from an arc having its center in alignment with the points of support.

In testimony whereof I affix my signature.

JOSEPH LAURIE LAWRENCE.